(No Model.)
D. P. HERSHBERGER.
DRAFT EQUALIZER.
No. 268,670. Patented Dec. 5, 1882.
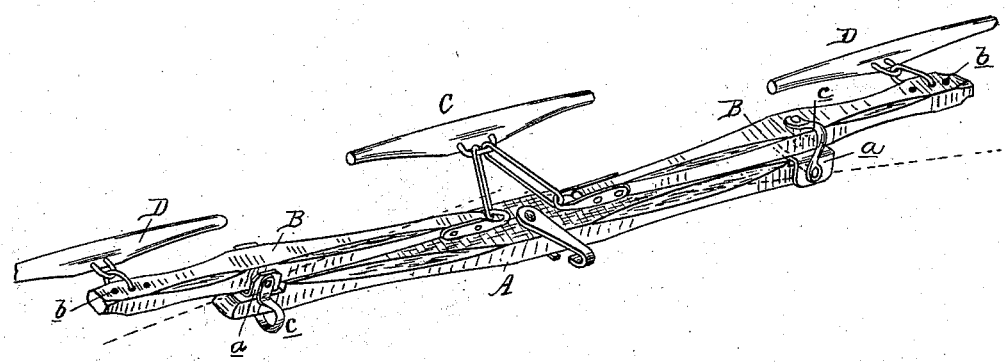

UNITED STATES PATENT OFFICE.

DANIEL P. HERSHBERGER, OF GOSHEN, INDIANA.

DRAFT-EQUALIZER.

SPECIFICATION forming part of Letters Patent No. 268,670, dated December 5, 1882.

Application filed April 13, 1882. (No model.)

*To all whom it may concern:*

Be it known that I, DANIEL P. HERSHBERGER, of Goshen, in the county of Elkhart and State of Indiana, have invented new and useful Improvements in Draft-Equalizers; and I hereby declare that the following is a full, clear, and exact description thereof, reference being had to the accompanying drawing, which form a part of this specification.

The nature of this invention relates to certain new and useful improvements in the construction of three-horse equalizers.

The invention consists in the peculiar construction, arrangement, and various combinations of the parts, all as more fully hereinafter set forth.

In the accompanying drawing, in which my invention is shown in perspective—

A represents the ordinary two-horse evener, provided with a suitable clevis or other means at its longitudinal center with which to attach it to the article to be drawn. To each end of this evener, and upon the top thereof, I pivotally secure the clips $a$ by means of a proper bolt. Between the ears of these clips I pivotally secure the double-trees B, at one side of their longitudinal center, and with the longer arm projecting inwardly. To the inner or longer arms of these double-trees B, I secure in any convenient manner the single-trees C, while to the shorter or outer arms I attach the single-trees D. The outer ends of the double-trees B are provided with a series of holes, $b$, by means of which the single-trees D may be adjusted to or from the pivotal points of such trees B, to increase or diminish the leverage of the outer horses in favor of or against the center horse. The double-trees B are each secured to the evener A by a bent loop, $c$, and two bolts passing at right angles to each other— one through each end of the loop $c$. By this construction I provide for an up-and-down or vertical play of the double-trees B, which relieves the central horse from the downdraft, which occurs especially in plowing.

What I claim as my invention is—

1. A draft-equalizer wherein the double-trees B are pivotally secured to the upper face of the main evener, and adapted to have a vertical rocking movement, substantially as and for the purposes set forth.

2. In a draft-equalizer, the combination, with the evener A and the double-trees B, of the loops $c$ and vertical and horizontal pivot-bolts passing through the evener and double-tree at right angles to each other, substantially as described, and for the purpose specified.

DANIEL P. HERSHBERGER.

Witnesses:
A. S. ZOOK,
JAS. R. DEVOR.